United States Patent
Russell et al.

(10) Patent No.: US 7,860,799 B2
(45) Date of Patent: Dec. 28, 2010

(54) METHODS, SYSTEMS, AND COMPUTER PROGRAM PRODUCTS FOR PROVIDING MEDIA CONTENT DELIVERY AUDIT AND VERIFICATION SERVICES

(75) Inventors: Travis E. Russell, Clayton, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 583 days.

(21) Appl. No.: 11/413,064

(22) Filed: Apr. 27, 2006

(65) Prior Publication Data

US 2007/0094142 A1    Apr. 26, 2007

Related U.S. Application Data

(60) Provisional application No. 60/729,997, filed on Oct. 25, 2005.

(51) Int. Cl.
*G06Q 99/00* (2006.01)
(52) U.S. Cl. .............. 705/52; 705/50; 705/51; 705/57; 705/59; 705/64; 709/224; 709/206; 370/389; 380/200; 380/201; 380/202; 380/203
(58) Field of Classification Search ............. 705/50–59; 709/224, 206; 370/389; 726/26–33; 380/200–203
See application file for complete search history.

(56) References Cited

U.S. PATENT DOCUMENTS

| | | | |
|---|---|---|---|
| 6,904,058 B2 | 6/2005 | He et al. | |
| 7,191,332 B1 | 3/2007 | Pankaiakshan et al. | |
| 7,388,855 B2 | 6/2008 | Madour | |
| 7,720,463 B2 | 5/2010 | Marsico | |
| 2002/0141584 A1 | 10/2002 | Razdan et al. | |
| 2002/0184527 A1* | 12/2002 | Chun et al. .................. | 713/201 |
| 2003/0032409 A1 | 2/2003 | Hutcheson et al. | |
| 2003/0134622 A1 | 7/2003 | Hsu et al. | |
| 2003/0211843 A1 | 11/2003 | Song et al. | |

(Continued)

FOREIGN PATENT DOCUMENTS

WO    WO 02/15607 A2    2/2002

(Continued)

OTHER PUBLICATIONS

Notification of Transmittal of the International Search Report and the Written Opinion of the International Searching Authority, or the Declaration corresponding to PCT application No. PCT/US06/41450 (Jan. 22, 2008).

(Continued)

*Primary Examiner*—Jalatee Worjloh
(74) *Attorney, Agent, or Firm*—Jenkins, Wilson, Taylor & Hunt, P.A.

(57) ABSTRACT

Methods, systems, and computer program products for providing media content delivery audit and verification services are disclosed. In one example, a monitoring system analyzes messages associated with communications in a wireless communications network. The monitoring system identifies, from the messages, messages that are associated with the request for or delivery of media content to a wireless communications device via the network. Copies of the messages relating to media content delivery are generated, correlated, and analyzed in order to provide a network operator with information that may be used to verify media content delivery transactions and associated revenues.

32 Claims, 5 Drawing Sheets

U.S. PATENT DOCUMENTS

| | | | |
|---|---|---|---|
| 2004/0109558 A1 | 6/2004 | Koch | |
| 2004/0143497 A1 | 7/2004 | Hayashi et al. | |
| 2004/0167977 A1* | 8/2004 | Douglas et al. | 709/224 |
| 2004/0198371 A1 | 10/2004 | Balasubramanian et al. | |
| 2005/0015583 A1 | 1/2005 | Sarkkinen et al. | |
| 2005/0038707 A1 | 2/2005 | Roever et al. | |
| 2005/0047335 A1 | 3/2005 | Cheng et al. | |
| 2005/0079869 A1 | 4/2005 | Khalil et al. | |
| 2005/0086683 A1 | 4/2005 | Meyerson | |
| 2005/0102397 A1* | 5/2005 | Tsuyama et al. | 709/225 |
| 2005/0138379 A1 | 6/2005 | Semple et al. | |
| 2006/0161626 A1* | 7/2006 | Cardina et al. | 709/206 |
| 2006/0165227 A1 | 7/2006 | Steeb et al. | |
| 2006/0271488 A1* | 11/2006 | Maes | 705/52 |
| 2007/0042757 A1 | 2/2007 | Jung et al. | |
| 2007/0049342 A1 | 3/2007 | Mayer et al. | |
| 2007/0050510 A1* | 3/2007 | Jiang | 709/227 |
| 2007/0067794 A1 | 3/2007 | Russell et al. | |
| 2007/0078714 A1 | 4/2007 | Ott, IV et al. | |
| 2007/0086380 A1 | 4/2007 | Lim et al. | |
| 2007/0086437 A1 | 4/2007 | DiFazio et al. | |
| 2007/0094712 A1 | 4/2007 | Gibbs et al. | |
| 2007/0124784 A1 | 5/2007 | Shon et al. | |
| 2007/0124785 A1 | 5/2007 | Marsico | |
| 2007/0220106 A1 | 9/2007 | Reisman | |
| 2007/0275742 A1 | 11/2007 | Zhang | |
| 2008/0276304 A1 | 11/2008 | Maffione et al. | |
| 2009/0075635 A1 | 3/2009 | Russell et al. | |
| 2009/0147721 A1 | 6/2009 | Shim et al. | |
| 2009/0157697 A1 | 6/2009 | Conway et al. | |

FOREIGN PATENT DOCUMENTS

| | | | |
|---|---|---|---|
| WO | WO 2005/041549 | * | 5/2005 |
| WO | WO 2007/027895 A2 | | 3/2007 |
| WO | WO 2007/030270 A2 | | 3/2007 |

OTHER PUBLICATIONS

Commonly-assigned, co-pending U.S. Appl. No. 12/276,251 for "Methods, Systems, and Computer Program Products for Providing Media Content Delivery Audit and Verification Services," (Unpublished, filed Nov. 21, 2008).

Communication of European Publication Number and Information on the Application of Article 67(3) EPC for European Patent No. 1949331 (Jul. 2, 2008).

Communication of European Publication Number and Information on the Application of Article 67(3) EPC for European Application No. 06801317.6 (May 28, 2008).

Notification of Transmittal of the International Search Report and the Written Opinion of the International Searching Authority, or the Declaration for International Application No. PCT/US06/34034 (Sep. 24, 2007).

Notification of Transmittal of the International Search Report and the Written Opinion of the International Searching Authority, or the Declaration for International Application No. PCT/US06/31471 (Apr. 24, 2007).

Harte, "10 Things You Need to Know About IP Television," www.IPTVMagazine.com, pp. 27-34 (Jul. 2005).

Lee, "3GPP2 Broadcast and Multicast Services BCMCS," KRnet2005, pp. 1-40, (Jun. 2005).

"Broadcast and Multicast Service in cdma2000 Wireless IP Network," 3rd Generation Partnership Project 2, 3GPP2 X.S0022-0, Version 1.0, 98 pages (Dec. 2004).

"Broadcast and Multicast Service in cdma2000® Wireless IP Network," TIA-1041 Ballot Version (Aug. 2004).

Wang et al., "Broadcast and Multicast Services in cdma2000," IEEE Communications Magazine, pp. 76-82 (Feb. 2004).

Calhoun et al., "Diameter Base Protocol," RFC Archive RFC 3588, Network Working Group, Ericsson, pp. 1-149, Ericsson (Sep. 2003).

Marcovici, "Joint Meeting 3GPP / 3GPP2," 3rd Generation Partnership Project 2, "3GPP2" S3-030450, pp. 1-25 (Jul. 16, 2003).

Rose et al., "BCMCS Security Framework," QUALCOMM S3-030451, pp. 1-24 (Jul. 16, 2003).

Kasargod et al., Packet data in the Ericsson CDMA2000 radio access network, Ericsson Review No. 3 (2002).

Chuah et al., Quality of Service in Third-Generation IP-Based Radio Access Networks, Bell Labs Technical Journal 7(2), pp. 67-89 (2002).

Aboba et al., "RADIUS and IPv6," Network Working Group, www.ietf.org/rfc/rfc3162. txt, pp. 1-12 (Aug. 2001).

Rigney, "RADIUS Accounting," Network Working Group, www.ietf.org/rfc/rfc2866.txt, pp. 1-27 (Jun. 2000).

Rigney et al., "Remote Authentication Dial in User Service (RADIUS)," www.ieft.org/rfc rfc2865.txt, pp. 1-71 (Jun. 2000).

Fielding et al., "Hypertext Transfer Protocol—HTTP/1.1," Network Working Group, W3C/MIT, 114 pgs. (Jun. 1999).

de Goyeneche, "Multicast over TCP/IP HOWTO," v1.0, pp. 1-30 (Mar. 20, 1998).

Semeria et al., "Introduction to IP Multicast Routing," draft-semeria-multicast-intro-00.txt, pp. 1-15 (May 1996).

Chowdhury, et al., "Broadcast-Multicast Service Controller Discovery via DHCP-Option-Codes," txt draft-chowdhury-dhc-bcmcv4-option-00.txt, draft-chowdhury-dhc-bcmcv6-option-00.txt, pp. 1-10 (Publication Date Unknown).

Official Action for U.S. Appl. No. 11/505,699 (Jun. 24, 2009).

Supplemental Notice of Allowability for U.S. Appl. No. 11/505,699 (Apr. 2, 2010).

Interview Summary for U.S. Appl. No. 12/276,251 (Mar. 11, 2010).

Supplemental Notice of Allowability for U.S. Appl. No. 11/505,699 (Feb. 26, 2010).

Notice of Allowance and Fee(s) Due for U.S. Appl. No. 11/505,699 (Dec. 31, 2009).

Official Action for U.S. Appl. No. 12/276,251 (Dec. 9, 2009).

"Short Message Point to Point Protocol Specification V5.0," SMS Forum Standard, p. 1-166 (Feb. 19, 2003).

"3$^{rd}$ Generation Partnership Project; Technical Specification Group Core Network; Mobile Application Part (MAP) Specification," 3GPP TS 09-02 V7.15.0, p. 1-875 (Release 1998).

Interview Summary for U.S. Appl. No. 12/276,251 (Aug. 27, 2010).

Final Official Action for U.S. Appl. No. 12/276,251 (Jun. 9, 2010).

Official Action for U.S. Appl. No. 12/276,251 (Sep. 27, 2010).

* cited by examiner

METHODS, SYSTEMS, AND COMPUTER PROGRAM PRODUCTS FOR PROVIDING MEDIA CONTENT DELIVERY AUDIT AND VERIFICATION SERVICES

RELATED APPLICATIONS

This application claims the benefit of U.S. Provisional Patent Application Ser. No. 60/729,997, filed Oct. 25, 2005, the disclosure of which is hereby incorporated herein by reference in its entirety.

TECHNICAL FIELD

The subject matter described herein relates to monitoring transactions associated with delivery of media content. More particularly, the subject matter described herein relates to methods, systems, and computer program products for providing media content delivery audit and verification services.

BACKGROUND ART

Over the past decade, the use of wireless communications devices, such as mobile telephones and personal digital assistants, has increased dramatically. This increased use has also led to an increase in the capabilities of these communications devices. In particular, wireless subscribers are increasingly using their wireless communications devices to access and download various types of media content, such as ringtones, music, video, graphics, photos, etc. Access to vendors that provide media content is provided by wireless network operators, who have previously negotiated service level agreements with each vendor. A third party clearinghouse entity is often used by media content owners to control access to and bill for the use of media content.

FIG. 1 illustrates an exemplary mobile networking environment 100, which includes a ringtone content provider 102, a third party clearinghouse entity 104, a first general packet radio service (GPRS) network 166 which is owned by network operator X, a second global system for mobile communications (GSM) or Interim Standard 41 (IS-41) cellular network 108 which is owned by network operator Y, and a third Internet protocol (IP) multimedia subsystem (IMS) network 110 which is owned by network operator Z. Mobile subscribers 112, 114, and 116 are respectively associated with networks 106, 108 and 110.

A typical service agreement may allocate 60% of revenue from a ringtone sale transaction to ringtone content provider 102, 30% of revenue from the transaction to network operator Y, and 10% of revenue from the transaction to the clearinghouse 104. In the example presented in FIG. 1, mobile subscriber 114 requests and receives downloadable ringtone content 118 from content provider 102. Content provider 102 reports the content download to the clearinghouse 104. Clearinghouse 104 subsequently bills mobile subscriber 114 $1.00 for the downloaded ringtone. Clearinghouse 104 in turn pays $0.60 to the ringtone content provider 102, $0.30 to network operator Y, and retains $0.10 as an administration fee.

One problem with the current media content delivery in wireless communications networks involves the fact that while network operator Y may be entitled to a 30% commission by a previously negotiated service agreement, there is no mechanism available to operator Y to independently monitor and verify content download transactions that involve the operator's network. Within the context of current content delivery solutions, a network operator is completely reliant on the good faith dealings of the content provider and the content delivery clearinghouse regarding content delivery transactions and the associated revenue.

Another problem associated with delivery of media content in wireless communications networks involves an operator's inability to verify the success or failure of an attempted media content download transaction. For instance, mobile subscriber 114 may contact a customer service center associated with network operator Y and claim that a ringtone download was purchased but never received. Currently, network operator Y has no way to verify whether or not the purchased ringtone content was successfully delivered to mobile subscriber 114. This inability leaves a network operator vulnerable to fraud and may result in a less than ideal quality of service within the network.

Accordingly, there exists a need for improved methods, systems, and computer program products for monitoring and auditing the delivery of media content in a wireless communications network.

SUMMARY

The subject matter described herein is generally directed to methods, systems, and computer program products for providing media content delivery audit and verification services. According to one aspect of the subject matter described herein, a monitoring system is adapted to analyze messages relating to communications in a wireless communications network and to identify, from the messages, messages that are associated with the request for or delivery of media content via the network. Copies of the messages relating to delivery of media content are generated, correlated, and analyzed in order to provide a network operator with information that may be used to verify media content delivery transactions and associated revenues.

The term "media content," as used herein, refers to any type of graphics, text, video, audio, audio/video, or other content that a user may wish to obtain from a media content provider obtain via a wireless communications network, and access via a wireless communications device. Examples of media content include ringtones, music files, video files, graphics files, audio files, such as audiobooks, text files, etc.

The term "wireless communications network," as used herein, refers to a network that is usable for communications between wireless devices. Examples of such networks include IS-41, GSM, Wi-Fi, or other types of networks where the link from the end user device to the network occurs over a wireless communications segment. It is understood that such networks may include wired components for carrying signaling related to media communications and also for carrying the media communications between network nodes.

The term "wireless communications device," as used herein, includes any device that a user can use for communications via a wireless wireless network. Examples of such devices include mobile telephones, personal digital assistants (PDAs), mobile phones with PDA capabilities, and PDAs with mobile phone capabilities.

The subject matter described herein for providing media content delivery audit and verification functionality may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer readable medium that implements the subject matter described herein may be located on a single device or computing platform or may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
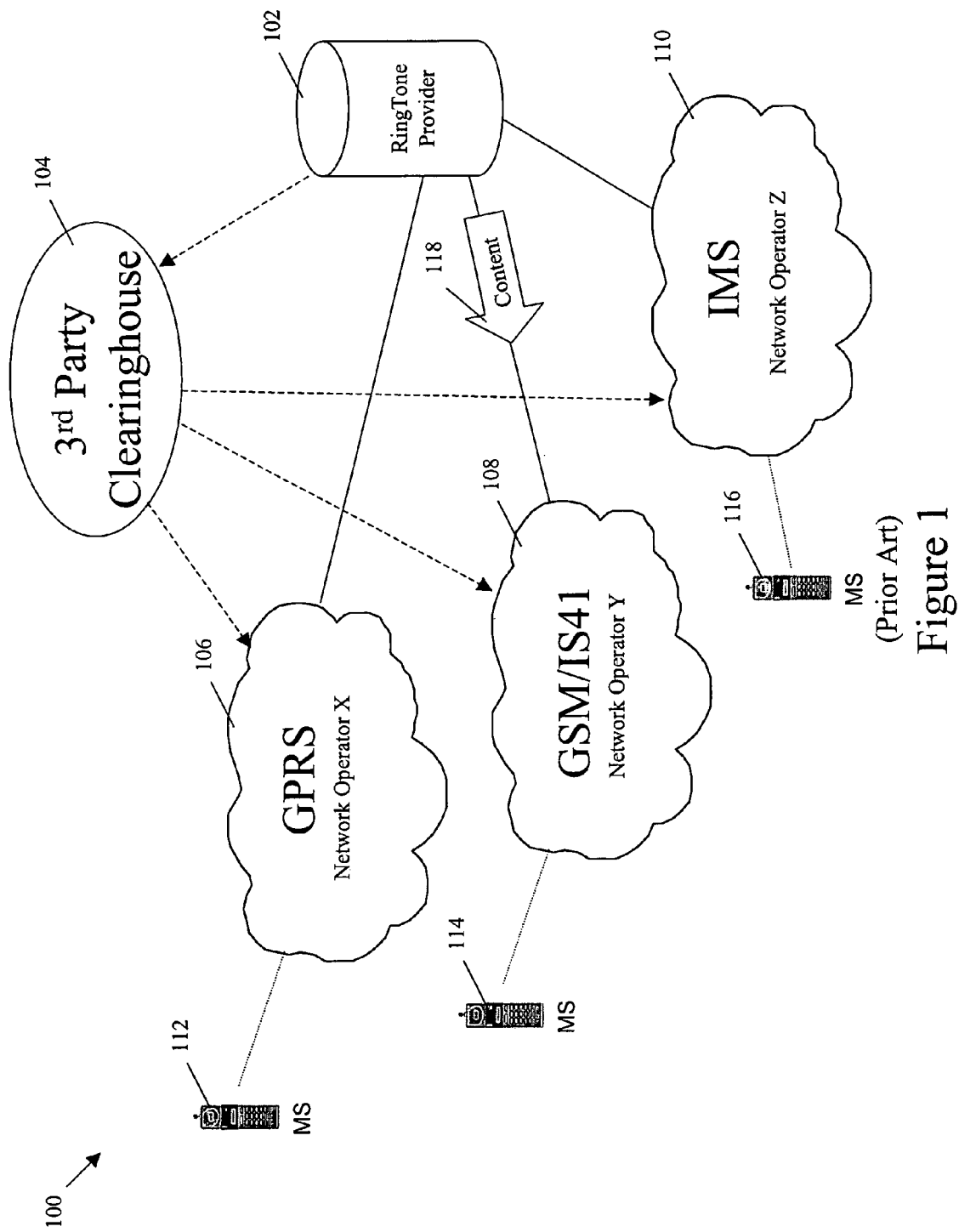
FIG. 1 is a network diagram illustrating an exemplary media content delivery service arrangement that includes a media content provider and a media content delivery clearinghouse entity.
Figure 2:
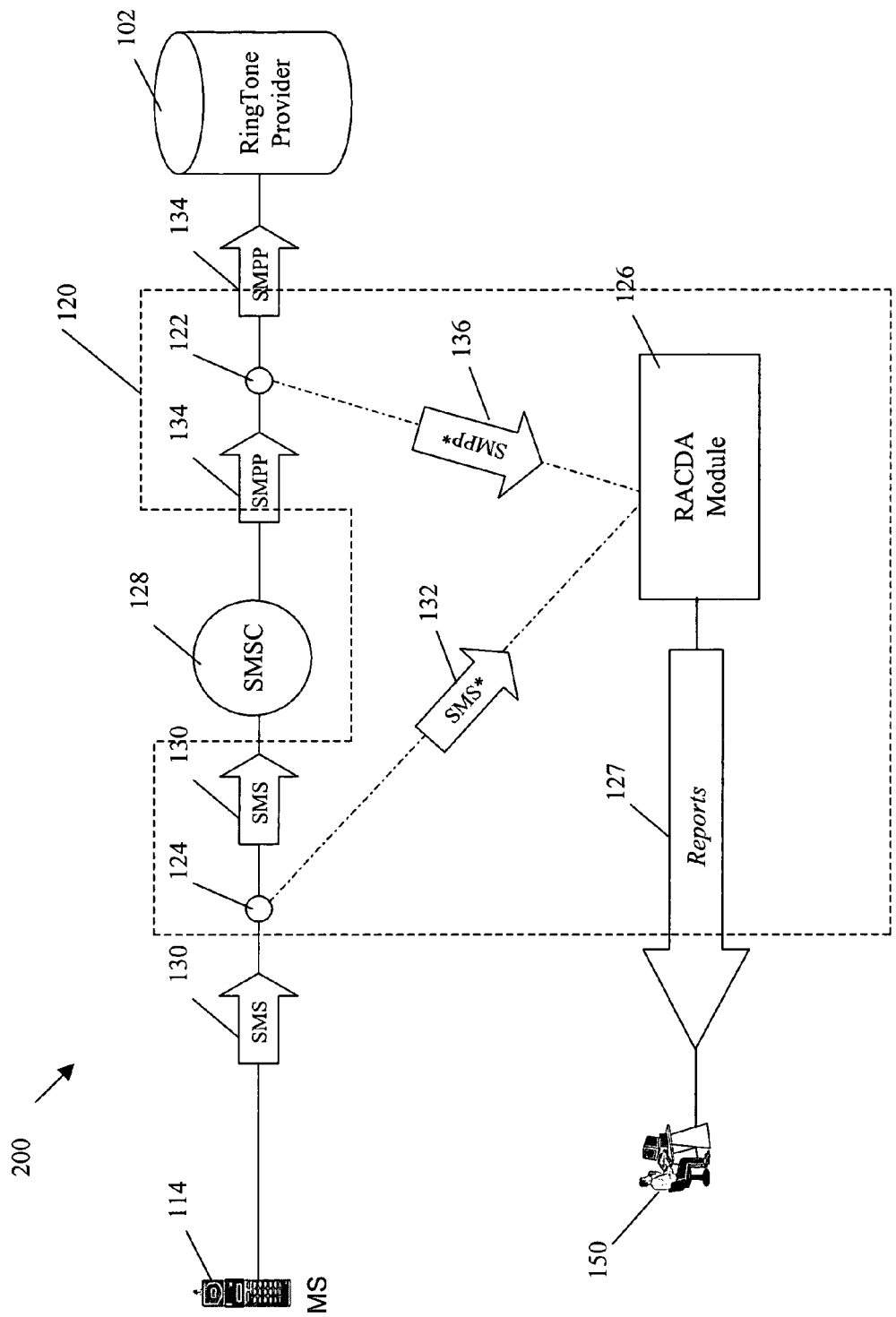
FIG. 2 is a network diagram illustrating a probe-based revenue assurance and content delivery audit (RACDA) system and exemplary messaging associated with a request for media content by a wireless subscriber according to an embodiment of the subject matter described herein.

FIG. 2 is a network diagram illustrating a network environment 119 that includes a short message service center (SMSC) 128, a mobile subscriber 114, and a probe-based embodiment of revenue assurance and content delivery audit (RACDA) system. For purposes of illustration, network environment 119 is considered to include components that operate in accordance with the global system for mobile communications (GSM) standard. Accordingly, mobile subscriber 114 and SMSC 128 are assumed to utilize equipment that operates in a GSM network environment. It is understood that the subject matter described herein is not limited to use in GSM network environments. Embodiments of the subject matter described herein may be operable in other communications network environments including IS-41, general packet radio service (GPRS), IP multimedia subsystem (IMS), session initiation protocol (SIP), radio access network (RAN), and wireless-fidelity (WiFi) (such as 802.11x) environments.

In the embodiment illustrated in FIG. 2, SMSC 128 is adapted to communicate with signaling system 7 (SS7) network entities as well as with short message point to point (SMPP) entities. SMSC 128 is further adapted to translate or convert SS7 short message service (SMS)-formatted messages to SMPP-formatted messages and vice-versa.

Network 119 also includes an exemplary revenue assurance and content delivery auditing (RACDA) system 120. According to one embodiment of the subject matter described herein, external communications link monitoring probes 122 and 124 may be adapted to generate copies of some or all messages observed on their respective communications links and forward the message copies to RACDA module 126. Link monitoring probes 122 and 124 may be any suitable devices for passively copying signaling messages that traverse network 119. In one example, probes 122 and 124 may be implemented using any suitable stand-alone network data collection system, including those available from Catapult Communications of Mountainview Calif. RACDA module 126 receives and analyzes messages copied by probes 122 and 124 and may use information obtained from the message copies to generate media content delivery diagnostic reports, revenue assurance reports, quality of service (QoS) reports, media content delivery rating reports that are based on one or more deliverable content attributes (e.g., attribute type=ringtone, attribute title="James Bond Ringtone #9", etc.) and other reports. RACDA module 126 may be implemented using any suitable general-purpose computing platform with network communication capabilities. In one exemplary implementation, RACDA module 126 may be implemented using a SUN Netra® server.

The reports generated by RACDA module 126 may be usable by a network operator to verify or audit service agreements with affiliated content providers. For example, RACDA module 126 may generate a media content delivery audit report that includes information associated with media content deliveries via a wireless network operator's network. The report may contain information usable by the operator to obtain and/or audit payments from a media content provider or clearinghouse for using the operator's network to deliver media content via the operator's network. If the content is downloadable content where the subscriber pays the media content provider or the clearinghouse directly, the report generated by RACDA module 126 may provide a useful way for the wireless network operator to audit transactions to which the operator is not a party.

The information collected by RACDA system 120 may also be used to provide the network operator with real time or near-real time content delivery diagnostic/QoS information. RACDA system 120 may copy, collect and analyze any type of message used to request or deliver content through a network. Exemplary message types/protocols that may be copied include SS7 mobile application part (MAP) short message service (SMS), IETF Sigtran, SIP, IP, hypertext transport protocol (HTTP), file transfer protocol (FTP), simple mail transfer protocol (SMTP), and SMPP.

Figure 3:
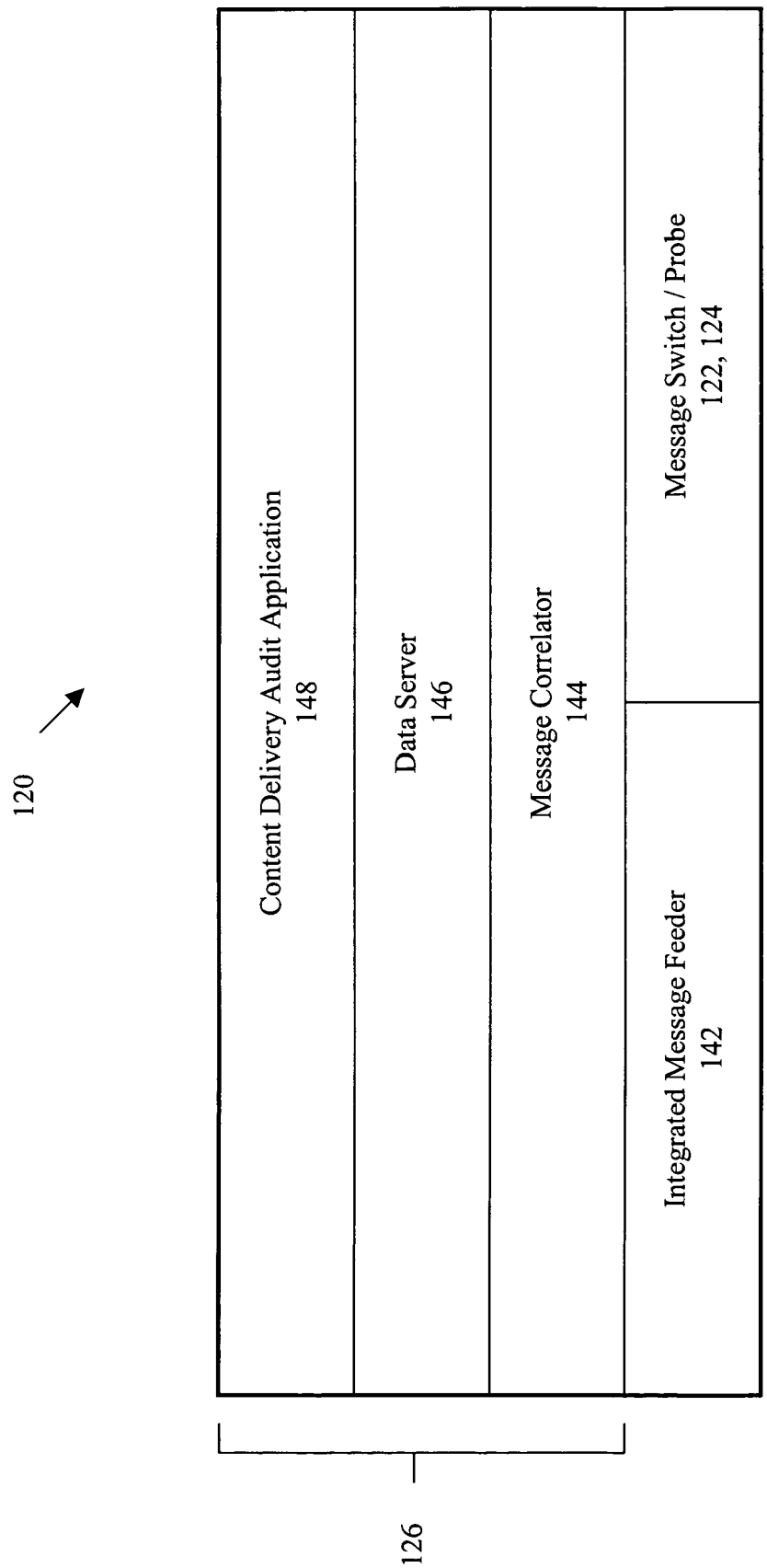
FIG. 3 is a block diagram illustrates functional components of a RACDA system according to an embodiment of the subject matter described herein.

FIG. 3 is a block diagram of an exemplary RACDA system 120 according to an embodiment of the subject matter described herein. Exemplary system 120 may include an external communications link probe or message switch 122 or 124, which is adapted to observe messages as they are carried on the communications link and generate copies of some or all of these messages. For example, probes 122 and 124 may include associated message monitoring functions for identifying and copying messages associated with media content delivery transactions.

System 120 may also include a message feed function 142 that is adapted to be integrated with a communications network element. Exemplary network elements may include a signal transfer points (STPs), Internet protocol (IP) capable STPs, IP routers, short message service center (SMSCs), short message gateways (SMGs), mobile switching centers (MSCs), 3G message servers, SIP servers, an IMS nodes, media gateway controllers (MGCs), and softswitches. Integrated message feed (IMF) function 142 is adapted to observe messages that are received by or transmitted from the host network element and generate copies of some or all of the messages. IMF function 142 may include an associated message monitoring functions for identifying and copying messages associated with media content delivery transactions.

One exemplary location for the integrated message feed function to reside is on a network node that provides a network routing function, such as an STP. System 120 may include multiple external link probes, multiple IMF functions, and to operate using both external link probes and IMF functions simultaneously.

System 120 further includes a message correlation function 144 that is adapted to receive copies of observed messages from external link probe 122 or 124 or IMF function 142 and organize or correlate these message copies, such that messages associated with the same content delivery transaction are identified and grouped or linked together.

In one embodiment, correlation function 144 is adapted to generate a media content delivery transaction detail record (TDR) for each observed media content delivery transaction. A media content delivery TDR may include some or all parameters contained in the message or messages associated with a media content delivery transaction. A media content delivery TDR may, for example, include information associated with a request from a mobile subscriber for a media content download, as well as information associated with the delivery of the requested content to the requesting subscriber. In one embodiment, correlation function 144 may associate date/timestamp information with a received message copy (and/or TDR) that is indicative of when the message copy was received.

In another embodiment, correlation function 144 may organize observed media content delivery transaction information according to any number of different correlation profiles. Observed messages that are correlated in accordance with a correlation profile may be tagged with a correlation identifier or otherwise indexed so as to facilitate fast and efficient access. Exemplary correlation profiles include content provider, delivery date/time, requesting subscriber, content type, delivery status, delivery mode, etc. For example, a content provider correlation profile may be used to sort or index observed content delivery transactions information by content provider. A media content provider identifier, such as a source network address that is uniquely associated with a media content provider, may be used to sort or index the observed media content delivery transaction information. In a similar manner, a delivery date/time correlation profile may be used to sort or index observed content delivery transaction information by the date/time of the content delivery transaction. A requesting subscriber correlation profile may be used to sort or index observed content delivery transaction information by the requesting subscriber. A subscriber identifier, such as a destination address (e.g., IP address, mobile identification number, mobile subscriber ISDN number, international mobile station identifier, electronic mail address, etc.) that is uniquely associated with each requesting mobile subscriber, may be used to sort or index the observed media content delivery transaction information A media content type correlation profile may be used to sort or index observed content delivery transaction information by the type of content associated with the delivery transaction. For example, correlation function 144 may perform the correlation based on payload type identification information contained in a message associated with a media content delivery transaction. Payload type identification information may include an explicit payload type identification parameter contained in an observed content delivery message, or such payload type information may be inferred based on message characteristics, such as payload size. Exemplary media content types may include ringtone, sports scores, stock ticker information, photograph/graphic image, and music. The media content type may also identify the format of the content, such as MPEG, JPEG, MP3, etc. Alternatively, correlation function 144 may perform such a content type correlation by exploiting knowledge that certain types of content are sourced from specific source addresses (e.g., IP host$_x$/port$_n$=ringtone content, IP host$_y$/port$_z$=sport scores, etc.).

A delivery status correlation profile may be used to sort or index observed content delivery transaction information by the status or disposition of the delivery transaction. For example, media content delivery status values may include an indicator of the success or failure of a delivery transaction. Content delivery status information may also include information related to a delivery receipt or delivery confirmation message associated with a media content delivery transaction. A delivery mode correlation profile may be used to sort or index observed media content delivery transaction information by the mode or transport characteristics of the delivery transaction. For example, correlation function 144 may perform the correlation based on a transport mode attribute, where transport mode attributes may include open system interconnection (OSI) layer attributes and SS7 protocol attributes. Delivery or transport mode attributes may include those protocols (at any layer of the OSI or SS7 stacks) used in a media. content delivery transaction. Exemplary OSI attributes that may be used by correlation function to correlate messages associated with media control delivery transactions include a layer 3 attribute=IP, a layer 4 attribute=transmission control protocol (TCP), user datagram protocol (UDP) or stream control transmission protocol (SCTP), and a layer 7 attribute=HTTP, FTP, SMTP, SIP, or SMPP. Exemplary SS7 protocol attributes include transaction capabilities application part (TCAP), mobile application part (MAP), and SMS. Exemplary media content delivery TDR records are presented below in Table 1.

TABLE 1

Exemplary Media Content Delivery TDR Records

| Date/Timestamp | Source Address | Requesting Subscriber ID | Media Content Type | Transaction Disposition | Delivery Mode |
| --- | --- | --- | --- | --- | --- |
| Jan. 4, 2006, 01:34:12 | Provider 1 | 9193451212 | Ringtone | Successful | IP/SIP |
| Jan. 1, 2006, 11:45.09 | Provider 2 | Joe@AOL.com | Ringtone | Failed | SMS |

Correlation profiles may be logically combined to provide more complex data correlations. For example, a media content provider correlation profile and a delivery date/time correlation profile may be logically combined to provide a view of media content delivery transactions that occurred during a particular date/time period, where the resulting information is sorted by content provider. As described above, observed media content delivery information (e.g., messages, message parameters, TDRs, etc.) may be simultaneously correlated according to multiple correlation profiles. Indices associated with each correlation or logical combination of multiple correlations may be constructed and stored to facilitate rapid, efficient access of the observed content delivery transaction information. The correlation profiles described above are merely illustrative of the types of correlations that may be performed by RACDA system 120 and are not intended to be an exhaustive list of possible correlations that could be provided by correlation function 144.

System 120 includes a data server 146, which is adapted to receive correlated media content delivery transaction information from correlation function 144 and store the information. As described above, media content delivery transaction information may include a copy of an observed media content delivery message, parameters associated with an observed media content delivery message, a media content delivery TDR, an index to information contained in an observed media content delivery message, or other information associated with an observed content delivery transaction.

A media content delivery audit application 148 is adapted to access media content delivery transaction information that is stored in data server 146. In one embodiment, application 148 may include a reporting function that is adapted to generate a media content delivery revenue assurance report, which details the number of successful content delivery transactions that were observed during a given period involving a particular media content provider. The information included in this report may be used to manually verify content delivery statistics provided by a media content provider or clearinghouse entity.

In an alternate embodiment, application 148 may include a reporting function that is adapted to receive media content delivery transaction information provided by a media content provider or clearinghouse entity and automatically analyze and compare this information against media content delivery transaction information stored on data server 146. A revenue assurance discrepancy report may be generated based on the analysis/comparison. The revenue assurance discrepancy report may identify and highlight discrepancies between the media content delivery transactions observed by system 120 and those transactions reported or claimed by the content provider or clearinghouse entity. An exemplary revenue assurance discrepancy report is illustrated below in Table 2.

mate date/time of the content delivery request in question. In response, application 148 is adapted to search media content delivery information stored on data server 146 and generate a viewable report 127 that presents all observed content delivery transactions and their dispositions (e.g., successful, failed, unknown, etc.) associated with the requesting mobile subscriber on or about the specified date/time. The entire signaling/messaging sequence associated with each observed content delivery transaction may be displayed such that those content delivery transactions that are identified as having a failed or unknown disposition may be analyzed by the network operator.

According to yet another aspect of the subject matter described herein, application 148 is adapted to log disputed media content delivery transactions and provide a report of disputed media content delivery transactions to a content provider and/or clearinghouse entity. If it is determined that the mobile subscriber customer is entitled to a refund and that the media content delivery problem was associated with the service provided by a media content provider, then application 148 may record and log the refund transaction and also include refund related information (e.g., refund amount) in the disputed media content delivery transaction report. As such, the subject matter described herein is adapted to assist a network operator in identifying and recovering revenue that is lost as a result of fraudulent activity or legitimate service problems associated with a media content provider.

Exemplary Revenue Assurance and Media Content Delivery Auditing System Implementations FIG. 2 illustrates an exemplary media content delivery transaction monitoring scenario that involves a request by mobile subscriber 114 for a ringtone content download from content provider 102. In this example, mobile subscriber 114 generates a short message that serves as the request for downloading the ringtone and transfers the message to the serving MSC (not shown). The serving MSC receives the transferred

TABLE 2

Exemplary Revenue Assurance Discrepancy Report

| Media Content Provider | Start Date | End Date | Media Content Type | Reported Transactions | Observed Successful Transactions | Observed Failed Transactions |
| --- | --- | --- | --- | --- | --- | --- |
| Provider 1 | Jan. 1, 2006 | Jan. 31, 2006 | Ringtone | 1,322,443 | 1,102,211 | 121,227 |
| Provider 2 | Jan. 1, 2006 | Jan. 31, 2006 | Ringtone | 324,245 | 315,654 | 8,591 |

According to another aspect of the subject matter described herein, application 148 is adapted to provide real time/near-real time and historical media content delivery transaction information to a network operations center or customer support center 150. This information may be used by network operations staff to analyze and diagnose problems associated with media content delivery transactions, in response to inquiries or complaints received from a network subscriber or from a media content provider.

For example, customer support center 150 may receive a call from a mobile subscriber in which the subscriber claims that he or she was billed for a requested media content download which was never received. Network support personnel may provide application 148 with an identifier associated with the requesting mobile subscriber (e.g., MSISDN, IMSI, TMSI, SIP URI, email address, IP address, routing number (RN), directory number (DN), etc.), as well as the approximessage and generates a related MAP MAP-MO-FORWARD-SHORT-MESSAGE message 130, which in this example is transmitted to SMSC 128. The particular content requested may be conveyed through information carried in the payload portion of the short message, or the desired content may be identified/associated with a short code or other destination address specified in the short message. A detailed description of MAP short message service messages is presented in 3*GPP TS* 09.02 *V*7. 15.0 (2004-03); 3*rd Generation Partnership Project; Technical Specification Group Core Network; Mobile Application Part (MAP) specification (Release* 1998), the disclosure of which is incorporated by reference herein in its entirety.

The MAP-MO-FORWARD-SHORT-MESSAGE message 130 is detected/observed by probe 124 and a copy of the message is generated. The message copy 132 is directed to RACDA module 126. Exemplary parameters contained in the MAP-MO-FORWARD-SHORT-MESSAGE message copy include an InvokeID parameter, an SM_RP_DA parameter, an SM_RP_OA parameter, an SM_RP_UI parameter, an IMSI User_Error parameter, and a Provider_Error parameter. Detailed descriptions and definitions of these parameters are located in the above referenced MAP specification. Message copy 132 is provided to correlation function 144. In this case, correlation function 144 determines that message 132 is associated with a new media content delivery transaction and accordingly generates a new TDR that is associated with the content delivery transaction. Some or all of the information associated with message copy 132 is incorporated within the TDR, and the TDR is then stored in data server 146.

SMSC 128 receives MAP message 130 and generates a related SMPP DELIVER_SM message 134, which is transmitted to media content provider 102. A detailed description of the SMPP protocol is provided in SMS Forum standard, *Short Message Point To Point Protocol Specification V5.0*, (Feb. 19, 2003), the disclosure of which is incorporated by reference herein in its entirety. The SMPP DELIVER_SM message 134 is detected/observed by probe 122 and a copy of the message is generated. Message copy 136 is directed to RACDA module 126.

Exemplary parameters contained in the SMPP DELIVER_SM message copy include a service_type parameter, a source_addr_ton parameter, a source_addr_npi parameter, a source_addr parameter, a dest_addr_ton parameter, a dest_addr_npi parameter, a dest_addr parameter, an esm_class parameter, a priority_flag parameter, a schedule_delivery_time parameter, a validity_period parameter, a registered_delivery parameter, an sm_length parameter, a short_message parameter. Detailed descriptions and definitions of these parameters are located in the above referenced SMPP specification.

Message copy 136 is provided to correlation function 144. In this case, correlation function 144 determines that message 136 is associated with the previously opened media content delivery transaction TDR, and some or all of the information contained in message 136 is appended to the TDR associated with that transaction. It will be appreciated that correlation function 144 may determine that messages 132 and 136 are associated with the same media content delivery transaction based on a similarity or other correlation that is identified between functionally similar parameters in the messages or other message attributes (e.g., timestamp information). For example, the SM_RP_OA parameter value in the MAP-MO-FORWARD-SHORT-MESSAGE message may be compared to the source_addr parameter in the SMPP DELIVER_SM message.

Figure 4:
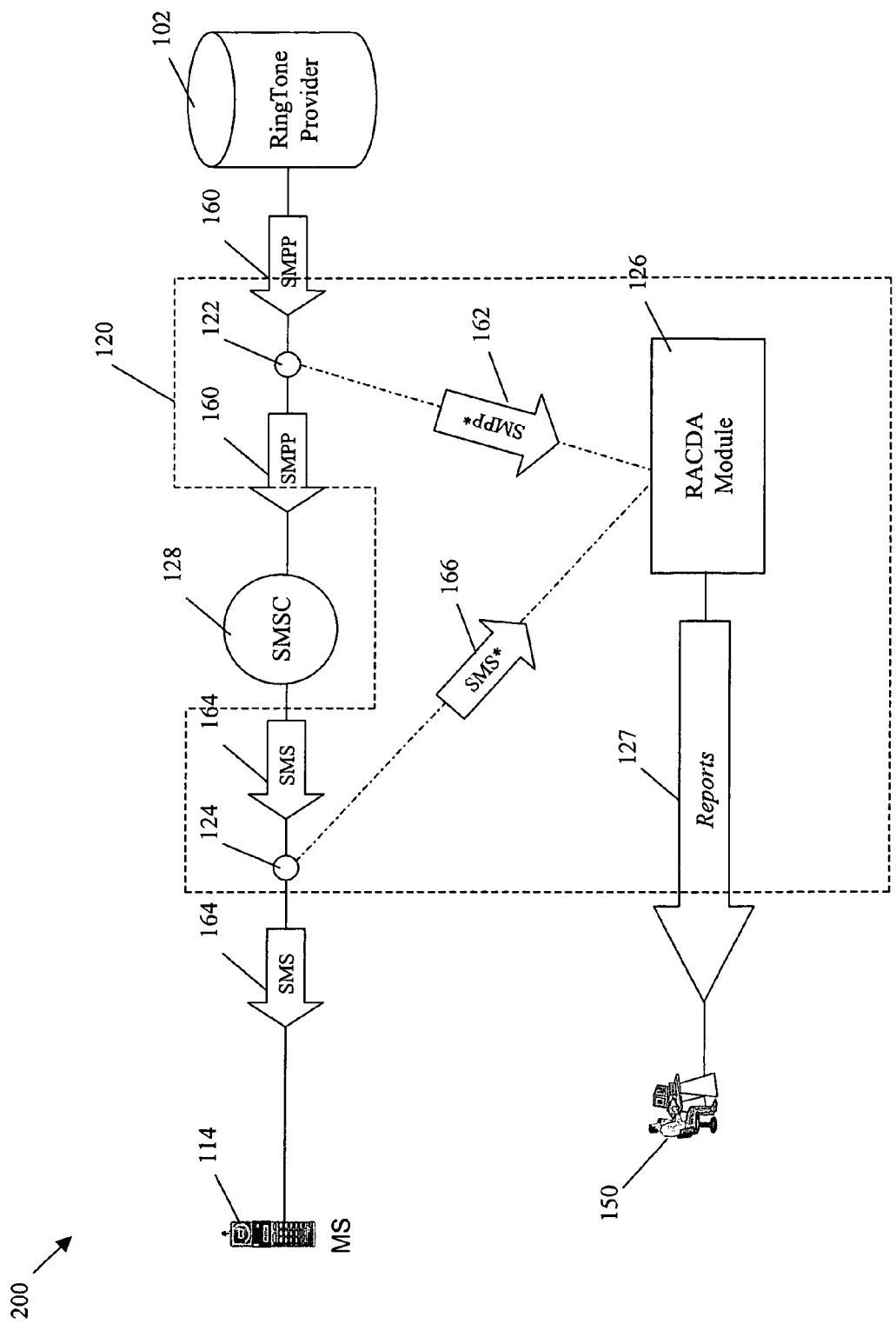
FIG. 4 is a network diagram illustrated a probe-based RACDA system and exemplary messaging associated with the delivery of media content from a media content provider according to an embodiment of the subject matter described herein.

Continuing with this media content delivery transaction example, FIG. 4 illustrates an exemplary message flow associated with the response of media content provider 102 to the content download request of mobile subscriber 114. In response to receiving media content download request message 134, media content provider 102 generates a SMPP SUBMIT_SM message 160 that includes the requested download content. Exemplary parameters contained in the SMPP SUBMIT_SM message copy include a service_type parameter, a source_addr_ton parameter, a source_addr_npi parameter, a source_addr parameter, a dest_addr_ton parameter, a dest_addr_npi parameter, a dest_addr parameter, an esm_class parameter, a priority_flag parameter, a schedule_delivery_time parameter, a validity_period parameter, a registered_delivery parameter, an sm_length parameter, a short_message parameter. Detailed descriptions and definitions of these parameters are located in the above referenced SMPP specification.

Message 160 is transmitted to SMSC 128. The SMPP SUBMIT_SM message 134 is detected/observed by probe 122 and a copy of the message is generated. Message copy 162 is directed to RACDA module 126 and provided to correlation function 144. Correlation function 144 determines that message 162 is associated with the previously opened media content delivery transaction TDR, and some or all of the information contained in message 162 is appended to the TDR associated with that transaction. Once again, correlation function 144 may determine that messages 132, 136, and 162 are associated with the same media content delivery transaction based on a similarity or other correlation that is identified between functionally similar parameters in the messages or other message attributes (e.g., timestamp information).

SMSC 128 receives SMPP message 160 and generates a related MAP-MT-FORWARD-SHORT-MESSAGE message 164, the media content payload of which is ultimately delivered to requesting mobile subscriber 114. The MAP-MT-FORWARD-SHORT-MESSAGE message 164 is detected/observed by probe 124 and a copy of the message is generated. Message copy 166 is directed to RACDA module 126. Exemplary parameters contained in the MAP-MT-FORWARD-SHORT-MESSAGE message copy may include an InvokeID parameter, an SM_RP_DA parameter, an SM_RP_OA parameter, an SM_RP_UI parameter, a User_Error parameter, and a Provider_Error parameter. Detailed descriptions and definitions of these parameters can be found in the above-referenced MAP specification. Message copy 166 is provided to correlation function 144. In this case, correlation function 144 determines that message 166 is associated with the previously opened media content delivery transaction TDR and some or all of the information contained in message 166 is incorporated into the TDR associated with that transaction. Examples of parameters that may be included in the TDR include a media content provider identifier, a media content recipient identifier, a media content type identifier, a media content title, a time of media content delivery, and a status indicator indicating whether or not delivery of the media content was successful.

Correlation function 144 may determine that messages 132, 136, 162, and 166 are associated with the same media content delivery transaction based on a similarity or other correlation that is identified between functionally similar parameters in the messages or other message attributes (e.g., timestamp information).

The completed TDR is stored in data server 146 and may subsequently be accessed by one or more media content delivery audit/diagnostic applications, such as content delivery audit application 148. Application 148 may access, analyze and otherwise use information contained in the TDR to generate various audit and diagnostic reports associated with media content delivery transactions that occur in network 200.

The media content TDR or any information in the media content TDR may be used to confirm revenue that should be paid to the wireless network operator (e.g., from the media content provider or from a clearinghouse) associated with the delivery of media content to a wireless network subscriber. In another example, information contained in the TDR may be used by the wireless network operator to verify delivery of the media content to a mobile communications device. For example, if media content transactions appear on the wireless network subscriber's invoice from the wireless network operator for use of the wireless communications network, the media content TDR may be used by the wireless network operator to generate entries on the invoice for media content downloads and/or to handle disputes from wireless network subscriber regarding the delivery of the media content.

Alternate embodiments of a RACDA system may be adapted to monitor and analyze media content delivery transactions that employ any number of other suitable communications protocols including IP, HTTP, FTP, hypertext markup language (HTML), extensible markup language (XML), and SIP. For example, a mobile subscriber may use a SIP INFO or a SIP MESSAGE message to request a content download, and a content provider may provide the requested content download to the mobile subscriber using SIP INFO or SIP MESSAGE messages. Regardless of the communications protocol or protocols involved in a media content delivery transaction, a RACDA system is adapted to provide message correlation and reporting functionality similar to that previously described with respect to the SS7-based SMS embodiments.

Figure 5:
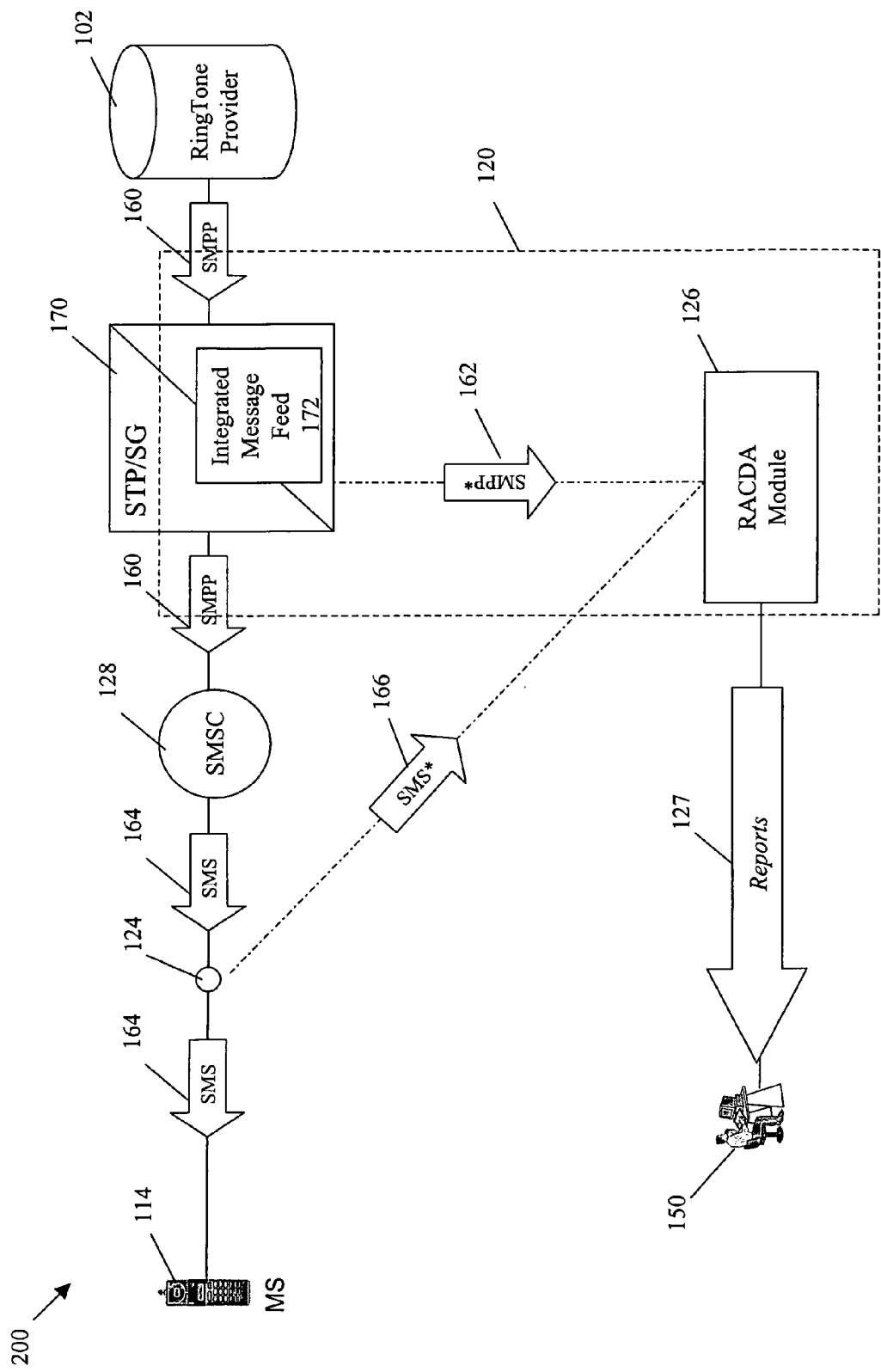
FIG. 5 is a network diagram illustrating an integrated message feed RACDA system and exemplary messaging associated with the delivery of media content from a media content provider according to an embodiment of the subject matter described herein.

FIG. 5 illustrates the media content delivery portion of an exemplary content delivery transaction monitoring scenario that involves a RACDA system embodiment which includes both an external communications link probe 124 and an IMF function 172 that is co-located with signal transfer point/SS7-IP gateway (SG) 170. In this example, an SMPP-based media content delivery message 160 is received by STP/SG 170 from content provider 102. IMF function 172 generates a copy of some or all of SMPP message 160 and communicates the message copy 162 to RACDA system 120. STP/SG 170 routes the original SMPP message 160 to SMSC 128. The SMSC generates a related MAP-MT-FORWARD-SHORT-MESSAGE message 164, the media content payload of which is ultimately delivered to the requesting mobile subscriber 114. The MAP-MT-FORWARD-SHORT-MESSAGE message 164 is detected/observed by probe 124 and a copy of the message is generated. SMS message copy 166 is directed to RACDA module 126. Once the SMPP and SMS messages are received by RACDA module 126 correlation, analysis, and reporting of the information contained in these messages proceeds in a manner similar to that previously described herein with respect to the external probe-based RACDA system embodiment.

According to another aspect of the subject matter described herein, RACDA system 120 may be used to generate ratings associated with the delivery of media content to wireless communications subscribers. For example, correlation function 144 of RACDA system 120 may identify messages associated with the delivery of media content to a plurality of wireless communications network subscribers via a wireless communications network. RACDA system 120 may generate, based on the messages, at least one measure indicative of an absolute or relative number of media content delivery being made to the wireless subscribers. The measure may be based on an attribute associated with the media content deliveries, such as a content type or a content title associated with the delivered content. For example, correlation function 144 of RACDA system 120 may generate ratings that indicate the most popular media content download during a time period. In another example, correlation function 144 of RACDA system 120 may generate ratings indicative of the total number of or most popular MP3 files that are being downloaded during a time period.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for auditing a media content delivery transaction, the method comprising:
   by at least one node in a wireless communications network that is not part of a media content provider:
      receiving copies, generated by a communications link probe or an integrated message feed, of messages that traverse the wireless communications network;
   analyzing the copies of the messages;
   identifying, from the copies of the messages, at least one message associated with delivery of media content provided by the media content provider to a wireless communications device via the wireless communications network;
   determining, based on the at least one message, whether or not the delivery of the media content was successful;
   generating, based on the at least one message, a media content delivery transaction record that contains information associated with the delivery of the media content;
   including, in the media content delivery transaction record, a transaction disposition indication that indicates whether or not the delivery of the media content was successful and at least one of a media content type, media content size, and a delivery mode;
   accessing, by an audit application at the node, the media content delivery transaction record and verifying, by the audit application at the node, delivery statistics provided by the media content provider; and
   confirming, based on the verification, revenue that should be paid to a network operator.

2. The method of claim 1 wherein identifying at least one message includes identifying a message of a protocol selected from a group consisting of Internet protocol (IP), signaling system 7 (SS7), Internet Engineering Task Force signaling transport (SIGTRAN), short message service (SMS), session initiation protocol (SIP), file transfer protocol (FTP), and hypertext transfer protocol (HTTP).

3. The method of claim 1 wherein the at least one identified message includes an address associated with a media content provider.

4. The method of claim 3 wherein identifying at least one message includes identifying the address as being associated with the media content provider.

5. The method of claim 1 wherein generating a media content delivery transaction record includes generating a copy of at least a portion of the at least one message.

6. The method of claim 5 wherein generating a copy of at least a portion of the at least one message includes generating a copy of a content recipient identifier in the message.

7. The method of claim 6 wherein the content recipient identifier comprises an identifier selected from the group consisting of a mobile station integrated services digital network (MSISDN) number, a mobile identification number (MIN), an international mobile station identifier (IMSI), a temporary IMSI (TMSI), a routing number (RN), a session initiation protocol uniform resource indicator (SIP URI), and an Internet protocol (IP) address.

8. The method of claim 5 wherein generating a copy of at least a portion of the at least one message includes generating a copy of an identifier of a media content provider in the at least one message and an identifier of the media content being delivered.

9. The method of claim 8 wherein the identifier of the media content provider comprises an identifier selected from the group consisting of a uniform resource locator (URL), a uniform resource identifier (URI), an SS7 address, and an IP address.

10. The method of claim 1 wherein the at least one node includes a signaling message routing node.

11. The method of claim 1 wherein the at least one node includes at a stand-alone data collection system.

12. The method of claim 1 wherein the media content includes mobile telephone ringtone content.

13. The method of claim 1 wherein generating a media content delivery transaction record includes generating a record that contains information associated with a media content delivery message.

14. The method of claim 1 wherein generating a media content delivery transaction record includes generating a record that contains information associated with a media content request message.

15. The method of claim 1 wherein generating a media content delivery transaction record includes generating a record that contains information associated with a media content request message and a media content delivery message.

16. The method of claim 1 including generating a media content delivery report using information contained in the media content delivery transaction record.

17. The method of claim 16 comprising using the media content delivery report to confirm that an operator of the wireless communications network is appropriately compensated for the delivery of the media content.

18. The method of claim 16 comprising using the media content delivery report to verify the delivery of requested content to the wireless communications device.

19. The method of claim 1 wherein the wireless communications device comprises at least one of a mobile telephone and a personal digital assistant.

20. The system of claim 1 wherein the communications link probe is external to the node and the integrated message feed is within the node.

21. A system for providing content delivery audit service in a wireless communications network environment, the system comprising:
  a communications link probe or an integrated message feed for copying messages that traverse a wireless communications network; and
  a node that is not part of a media content provider, the node comprising:
    a message monitoring function for analyzing the message copies and identifying, from the messages copies, at least a first message associated with a media content delivery transaction for delivering media content provided by the media content provider to a wireless communications device via the wireless communications network;
    a correlation function for receiving information associated with the at least a first message from the monitoring function and generating a media content transaction detail record (TDR) related to the observed media content delivery transaction, wherein the correlation function is adapted to generate the media content TDR at a location in the wireless communications network that is not associated with a media content provider, wherein the correlation function is adapted to determine, based on the at least first message, whether or not the delivery of the media content was successful at a location in the wireless communications network that is not part of a media content provider and wherein the correlation function includes, in the media content TDR, a transaction disposition indication that indicates whether or not delivery of the media content was successful and at least one of a media content type, media content size, and a delivery mode; and
    an audit application for accessing the media content delivery transaction record, verifying delivery statistics provided by the media content provider, and confirming, based on the verification, revenue that should be paid to a network operator.

22. The system of claim 21 wherein the at least a first message is communicated using a protocol selected from the group consisting of Internet protocol (IP), signaling system 7 (SS7), Internet Engineering Task Force SIGTRAN, short message service (SMS), session initiation protocol (SIP), file transfer protocol (FTP), hypertext transfer protocol (HTTP), transmission control protocol (TCP), user datagram protocol (UDP), and stream control transmission protocol (SCTP).

23. The system of claim 21 the communications link probe adapted to copy messages traversing signaling links external to network nodes, wherein the monitoring function is associated with the communications link probe.

24. The system of claim 21 comprising an integrated message feed adapted to copy messages from within a network node, wherein the monitoring function is associated with the integrated message feed.

25. The system of claim 21 wherein the correlation function is adapted to receive a copy of the at least a first message from the monitoring function.

26. The system of claim 21 wherein the correlation function is adapted to receive a second message associated with the media content delivery transaction from the monitoring function and to correlate the at least a first message and the second message.

27. The system of claim 21 wherein the audit application comprising a reporting function adapted to generate a media content delivery audit report usable by an operator of the wireless communications network to determine the amount of revenue due to the operator from the media content provider for delivering the media content to the subscriber.

28. The system of claim 21 wherein the reporting function is adapted to generate a media content delivery troubleshooting report.

29. The system of claim 21 wherein the communications link probe is external to the node and the integrated message feed is within the node.

30. A computer program product comprising computer-executable instructions embodied in a computer-readable medium for performing steps comprising:
  by at least one node in a wireless communications network that is not part of a media content provider:
  receiving copies, generated by a communications link probe or an integrated message feed, of messages that traverse the wireless communications network;
  analyzing the copies of the messages;
  identifying, from the copies of the messages, at least one message associated with delivery of media content provided by the media content provider to a wireless communications device via the wireless communications network;
  determining, based on the at least one message, whether or not the delivery of the media content was successful;
  generating, based on the at least one message, a media content delivery transaction record that contains information associated with the delivery of the media content;

including, in the media content delivery transaction record, a transaction disposition indication that indicates whether or not the delivery of the media content was successful and at least one of a media content type, media content size, and a delivery mode;

accessing, by an audit application at the node, the media content delivery transaction record and verifying, by the audit application at the node, delivery statistics provided by the media content provider; and confirming, based on the verification, revenue that should be paid to a network operator.

31. The computer program product of claim 30 including generating a content delivery report using information contained in the content delivery transaction record.

32. The system of claim 30 wherein the communications link probe is external to the node and the integrated message feed is within the node.

* * * * *